UNITED STATES PATENT OFFICE.

HEINRICH THRON, OF FRANKFORT-ON-THE-MAIN, GERMANY, ASSIGNOR TO VEREINIGTE CHININFABRIKEN ZIMMER & CO., GESELLSCHAFT MIT BESCHRÄNKTER HAFTUNG, OF FRANKFORT-ON-THE-MAIN, GERMANY.

CINNAMIC ETHER OF CINCHONA ALKALOIDS.

SPECIFICATION forming part of Letters Patent No. 697,042, dated April 8, 1902.

Original application filed April 24, 1901, Serial No. 57,322. Divided and this application filed February 12, 1902. Serial No. 93,784. (No specimens.)

*To all whom it may concern:*

Be it known that I, HEINRICH THRON, a subject of the Emperor of Germany, and a resident of Frankfort-on-the-Main, Germany, have invented certain new and useful Improvements in Pharmaceutical Products; and I hereby declare the following to be a clear and exact description of my invention.

My invention relates to the production of the hitherto unknown cinnamic-acid ethers of the cinchona alkaloids having, in case quinin is used, probably the following formulæ:

$$C_6H_5-CH=C.H.CO.O.C_{20}H_{23}N_2O.$$

The present application, which is a divisional application from my said original application, Serial No. 57,322, filed April 24, 1901, is designed to cover specifically the preparation of the cinnamic-acid ethers of the cinchona alkaloids. According to my researches these new compounds can be easily obtained by heating the alphyl ethers of cinnamic acid with the cinchona alkaloids. On using, for instance, the phenol ether of cinnamic acid and quinin the cinnamyl quinin is obtained, which is tasteless and posseses great therapeutic value. The average dose employed for medicinal purposes is about two grams.

In carrying out my new process practically I can proceed as follows: 32.4 kilos of quinin are heated with 22.4 kilos or more of phenol ether of cinnamic acid for a few hours to a temperature of 120° to 130° centigrade. The new cinnamyl quinin is then formed according to the following equation:

$$C_{20}H_{24}N_2O_2 + C_6H_5.CH=CH.COO.C_6H_5 = C_6H_5.CH=CH-COOC_{20}H_{23}N_2O + C_6H_5OH.$$

The product of the reaction is dissolved with benzene, the phenol removed therefrom by a diluted alkali, and the base is then extracted by a diluted acid. It is then precipitated by alkali and dissolved in ether. After evaporation of the ether the cinnamyl quinin separates in fine needles, melting at 111° centigrade, easily soluble in alcohol, benzene, and ether and difficultly in water and ligroin.

The new ether still retains basic properties and forms salts with organic and inorganic acids. These salts are also of great value in medicine, as therapeutic effect of the cinnamyl quinin may be modified and reinforced by the proper selection of the acid with which the ether is combined. Thus the salicylate of cinnamyl quinin will render the salt very efficient in rheumatic affections, whereas the cinnamic-acid salt of the cinnamic ether of quinin will be of great value in tuberculous affections.

Instead of the phenol ether of the cinnamic acid other alphyl ethers of cinnamic acid may be employed in the above process, and instead of quinin quinidin or other cinchona alkaloids may be used.

Having now described my invention and in what manner the same is to be performed, what I claim as new, and desire to secure by Letters Patent, is—

1. The herein-described new cinnamic-acid ethers of the cinchona alkaloids, being difficultly soluble in water, readily soluble in alcohol, benzene, and ether, possessing basic properties and forming with inorganic and organic acids well-characterized salts, substantially as hereinbefore described.

2. The herein-described new cinnamic-acid ether of quinin, having most probably the formula:

$$C_6H_5.CH=CH.COO.C_{20}H_{23}N_2O$$

being a tasteless white powder melting at 111° centigrade easily soluble in alcohol, ether and benzene, and difficultly soluble in water and ligroin, and forming well-characterized salts with inorganic and organic acids, substantially as described.

In testimony whereof I have signed my name in the presence of two subscribing witnesses.

HEINRICH THRON.

Witnesses:
WILHELM EITEL,
THEOPHIL REGELMANN.